US007894535B2

(12) United States Patent
Pantalone et al.

(10) Patent No.: US 7,894,535 B2
(45) Date of Patent: Feb. 22, 2011

(54) SYSTEMS AND METHODS FOR DISTRIBUTING AND/OR PLAYING MULTICASTED VIDEO SIGNALS IN MULTIPLE DISPLAY FORMATS

(75) Inventors: Brett A. Pantalone, Pittsboro, NC (US); William O. Camp, Jr., Chapel Hill, NC (US); Toby John Bowen, Durham, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 1485 days.

(21) Appl. No.: 11/209,434

(22) Filed: Aug. 23, 2005

(65) Prior Publication Data

US 2007/0056000 A1    Mar. 8, 2007

(51) Int. Cl.
*H04N 7/18* (2006.01)
(52) U.S. Cl. .................. 375/240.26; 375/240.01; 375/240.25
(58) Field of Classification Search ................. 375/240.01–240.29
See application file for complete search history.

(56) References Cited

U.S. PATENT DOCUMENTS

| 6,564,262 | B1 | 5/2003 | Chaddha |
| 6,637,032 | B1 * | 10/2003 | Feinleib ........... 725/110 |
| 7,548,995 | B2 * | 6/2009 | Thukral ............ 710/20 |
| 7,631,327 | B2 * | 12/2009 | Dempski et al. ...... 725/34 |
| 2002/0051581 | A1 | 5/2002 | Takeuchi et al. |
| 2003/0041256 | A1 | 2/2003 | Wee et al. |
| 2006/0104348 | A1 | 5/2006 | Chen et al. |

FOREIGN PATENT DOCUMENTS

| EP | 0 696 121 A1 | 2/1996 |
| EP | 1 217 841 A2 | 6/2002 |
| EP | 1 403 759 A2 | 3/2004 |
| WO | WO 02/067588 A2 | 8/2002 |

(Continued)

OTHER PUBLICATIONS

"Notification of Transmittal of the International Search Report and the Written Opinion of the International Searching Authority, or the Declaration", "Written Opinion of the International Searching Authority" and "International Search Report", PCT/US2004/035321, Apr. 26, 2005.

(Continued)

*Primary Examiner*—Andy S Rao
(74) *Attorney, Agent, or Firm*—Myers Bigel Sibley & Sajovec

(57) ABSTRACT

Video distribution methods include providing a primary video data stream having a first image size and formatted in a first video display format. A transmission data stream is formed having a plurality of blocks of data including at least first and second data fields. The first data field includes a secondary video data stream extracted from the primary video data stream and is formatted for display in a second video format. The second data field includes supplemental data extracted from the primary video data stream and configured to provide, when combined with the data of the first data field, a tertiary video data stream formatted for display in a third video format. The transmission data stream is multicasted from a wireless communication transmitter to a plurality of wireless communication terminals. Wireless communication terminals and systems are also disclosed.

37 Claims, 11 Drawing Sheets

FOREIGN PATENT DOCUMENTS

WO  WO 2005/039186 A1  4/2005

OTHER PUBLICATIONS

DANAE "Technology, Scalable Codecs" webpage <http://danae.rd.francetelecom.com/technology-codecs.php> 2pages, accessed on Jun. 23, 2005.

"The DVB-H specification includes:" webpage <http://www.cellular.co.za/technologies/dvb-h/dvb-h-technical-specs.htm> 4 pages, accessed on Jun. 23, 2005.

"Digital Video Mobile Broadcast (DVB-H) Specification" webpage 6 pages, accessed on Jun. 23, 2005.

Pekowsky et al. "DVB-H Architecture for Mobile Communications Systems" *Broadcast/Satellite Communications* Apr. 2005 pp. 36-42.

Ankeny "A Big Opportunity for the Smallest Screen" *Wireless Review* webpage <http://wirelessreveiw.com/mag/wireless_big_opportunity_smallest/> 3 pages, accessed on Jun. 23, 2005.

TeliaSonera "Mobile Broadcast/Multicast Service (MBMS)" 11pages (Aug. 2004).

Schierl et al. "Wireless Broadcasting Using the Scalable Extension of H.264/AVC" *Fraunhofer Institue for Telecommunications, Heinrich Hertz Institute, Image Processing Department* 4 pages (date unknown).

Streamcrest "Broadcast Popular Content Instead" brochure, 2 pages (2004).

International Search Report and Written Opinion for PCT/US2006/011822; Date of mailing Aug. 2, 2006.

Naghshineh et al. "End-to-End QoS Provisioning in Multimedia Wireless/Mobile Networks Using an Adaptive Framework" *IEEE Communications Magazine* 72-81 (1997).

Pang et al. "QoS Multicasting over Mobile Networks" *IEEE Globecom Proceedings* 3697-3701 (2005).

\* cited by examiner

SYSTEMS AND METHODS FOR DISTRIBUTING AND/OR PLAYING MULTICASTED VIDEO SIGNALS IN MULTIPLE DISPLAY FORMATS

FIELD OF THE INVENTION

This invention relates to communications systems and methods, and more particularly to systems and methods for distributing and/or playing video content.

BACKGROUND

With the advent of large-scale wireless communications networks, such as cellular and PCS networks, the distribution of multimedia content over these networks may increase. As used herein, the term "multimedia" content includes analog or digital audio, analog or digital image and/or analog or digital video content.

Mobile wireless communication terminals, such as cellular handsets, wireless RF-equipped personal data assistants (PDAs) and the like, used in a particular network or communication system may have a wide range of functions and/or features. Manufacturers and service providers may provide a wide range of product offerings to customers in order to cater to as broad a segment of the potential market as possible. Thus, for example, some wireless communication terminals used in a network may be capable of downloading and playing high-quality video content, while other wireless communication terminals in the same network may only be capable of downloading and/or playing medium-quality or low-quality video content.

In some cases, wireless communication terminals that may be capable of playing video content of a particular quality may nevertheless be capable of or suited for content having a particular format. For example, a wireless terminal may be configured to display a DVD-quality video stream having a particular aspect ratio, such as 16:9, while another wireless terminal on the same network may be configured to display DVD-quality video in a 4:3 aspect ratio. In particular, a number of standard video formats have been proposed for mobile terminals, including Quarter VGA (QVGA, 320×240 pixels), Common Intermediate Format (CIF, 360×288 pixels) and Quarter Common Intermediate Format (QCIF, 180×144 pixels). Moreover, some mobile terminals may have multiple display screens having different display capabilities. Thus, mobile terminals may be capable of displaying video in one or more of a number of different display formats.

Point-to-point communication of video signals may require an excessive amount of bandwidth, particularly on a wireless network. However, point-to-multipoint transmission (i.e. multicasting) of video content may be an efficient use of the limited bandwidth available to wireless networks. Thus, various protocols for multicasting and broadcasting of video data over wireless networks have been proposed. For example, MBMS (Mobile Broadcast/Multicast Service) and DVB-H (Digital Video Broadcast—Handheld) protocols have been proposed. DVB-H, in particular, is an extension of a digital video broadcast protocol that has been implemented on wired networks in Europe.

SUMMARY

Embodiments of the invention provide video distribution methods in which providing a primary video data stream having a first image size and formatted in a first video display format is provided. A transmission data stream is formed having a plurality of blocks of data including at least first and second data fields. In some embodiments of the invention, a block of the video data stream corresponds to a video frame. The first data field includes a secondary video data stream extracted from the primary video data stream and is formatted for display in a second video format. The second data field includes supplemental data extracted from the primary video data stream and configured to provide, when combined with the data of the first data field, a tertiary video data stream formatted for display in a third video format. The first and second data fields may be contiguous. The transmission data stream is multicasted from a wireless communication transmitter to a plurality of wireless communication terminals.

Some embodiments of the invention include receiving the first data field of a block of the multicasted video data stream at a wireless communication terminal having a memory, and storing the first data field in the memory. The second data field of the block of the multicasted video data stream is received at the wireless communication terminal and combined with the first data field to generate the tertiary video data stream. The tertiary video data stream may be displayed at the wireless terminal.

In some embodiments of the invention, the wireless communication terminal may switch its wireless receiver off after receiving the second data field of a block and switch its receiver on at the start of a subsequent block. In further embodiments of the invention, the wireless communication terminal may switch the wireless receiver off after receiving the first data field of a block, and switch the receiver on at the start of a subsequent block.

In some embodiments of the invention, the wireless communication terminal may store the second data field in the memory prior to combining the first data field and the second data field.

In some embodiments of the invention, the primary video data stream may include video data having a first number of lines per frame and a first number of pixels per line, and the secondary video data stream may include video data having a second number of lines per frame that is less than the first number of lines per frame and/or a second number of pixels per line that is less than the first number of pixels per line. The tertiary video data stream may include video data having a third number of lines per frame that is greater than the second number of lines per frame and/or a third number of pixels per line that is greater than the second number of pixels per line.

In some embodiments of the invention, the primary video data stream may include video data having a first number of bits per pixel, and the secondary video data stream may include video data having a second number of bits per pixel that is less than the first number of bits per pixel. The tertiary video data stream comprises video data having a third number of bits per pixel that is greater than the second number of bits per pixel.

In some embodiments of the invention, the primary video data stream may include video data having a first number of frames per second, and the secondary video data stream may include video data having a second number frames per second that is less than the first number of frames per second. The tertiary video data stream may include video data having a third number of frames per second that is greater than the second number of frames per second.

In further embodiments of the invention, the first data field and the second data field of a block are combined to generate a first video frame, and first and second data fields of a subsequently received block are combined to generate a second video frame. The first and second video frames are interpolated to generate a third video frame intermediate the first video frame and the second video frame. The first video frame, the third video frame and the second video frame may be displayed in order at the wireless communication terminal.

Some embodiments of the invention provide a video distribution method including providing a primary video data stream formatted in a first video display format and re-formatting the primary video data stream to provide a secondary video data stream formatted for display in a second video display format. A block of video display data is generated including at least a first data field containing the secondary video data stream, and a second data field containing supplemental data configured to provide, when combined with the first data field, an enhanced video data stream formatted for display in a third video format different from the first and second video display formats. The block of video display data is multicasted from a wireless communication transmitter to a plurality of wireless communication terminals.

In some embodiments of the invention, a block of the transmission data stream includes a third data field containing supplemental data configured to provide, when combined with data of the first data field, an enhanced video data stream formatted for display in a fourth video format different from the second and third video display formats.

Some embodiments of the invention provide wireless communication terminals having a memory, a receiver, and a controller coupled to the memory and the receiver. The controller is configured to receive first and second data fields of a block of a multicasted video data stream from the receiver and combine the first data field and the second data field to generate an enhanced video data stream. The controller is further configured to play the enhanced video data stream. In addition, the controller may further be configured to switch the receiver off after receiving the first and/or second data field.

In some embodiments, wherein the controller may be configured to generate a first video frame from the first and second data fields of a first block of video data and generate a second video frame from the first and second data fields of a second block of video data. The controller may be further configured to interpolate the first video frame and the second video frame to generate a third video frame intermediate the first video frame and the second video frame, and to sequentially play the first video frame, the third video frame and the second video frame.

A wireless communication system according to some embodiments of the invention includes a multimedia server configured to extract a secondary video data stream from a primary video data stream, and to form a transmission data stream comprising a plurality of blocks of data having at least first and second data fields, wherein the first data field includes the secondary video data stream and the second data field includes supplemental data configured to provide, when combined with the first data field, a tertiary video data stream.

In some embodiments of the invention, the primary video data stream is formatted for display in a first video format, and the secondary video data stream is formatted for display in a second video format different from the first video format. The tertiary video data stream may be formatted for display in a third video display format different from the first and second video display formats. The first and third video display formats may be the same.

In some embodiments of the invention, the system further includes a plurality of wireless communication terminals having a memory, a receiver; and a controller coupled to the memory and the receiver and configured to receive a first data field of a block of the transmission data stream from the receiver and store the received first data field in the memory, receive a second data field of the block of the transmission data stream, combine the first data field and the second data field to generate an enhanced video data stream, and play the tertiary video data stream.

Video distribution methods according to further embodiments of the invention include providing a primary video data stream having a first image size and formatted in a first video display format. A transmission data stream including a plurality of blocks of data having at least first, second and third data fields is formed. The first data field includes a secondary video data stream extracted from the primary video data stream and formatted for display in a second video format. The second data field includes color enhancement data extracted from the primary video data stream. The third data field includes size/resolution enhancement data extracted from the primary video data stream. The color enhancement data is configured to provide, when combined with the data of the first data field, a color-enhanced secondary video data stream. The size/resolution enhancement data is configured to provide, when combined with the data of the first data field, a tertiary video data stream formatted for display in a third video format. The transmission data stream is multicasted from a wireless communication transmitter to a plurality of wireless communication terminals.

In some embodiments of the invention, the transmission data stream further includes a fourth data field including second color enhancement data configured to provide, when combined with the data of the first, second and third data fields, a color-enhanced tertiary video data stream formatted for display in the third video format.

Some embodiments of the invention provide a wireless communication terminal including a wireless receiver, a primary display configured to display a video data stream in a first video display format and a secondary display configured to display a video data stream in a second video display format. The wireless communication terminal further includes a controller coupled to the wireless receiver and configured to receive a first data field of a block of a multicasted video data stream from the wireless receiver and store the received first data field in the memory, receive a second data field of the block of the multicasted video data stream, combine the first data field and the second data field to generate an enhanced video data stream, and play the tertiary video data stream on one of the primary display or the secondary display.

DETAILED DESCRIPTION OF EMBODIMENTS OF THE INVENTION

Figure 1A:
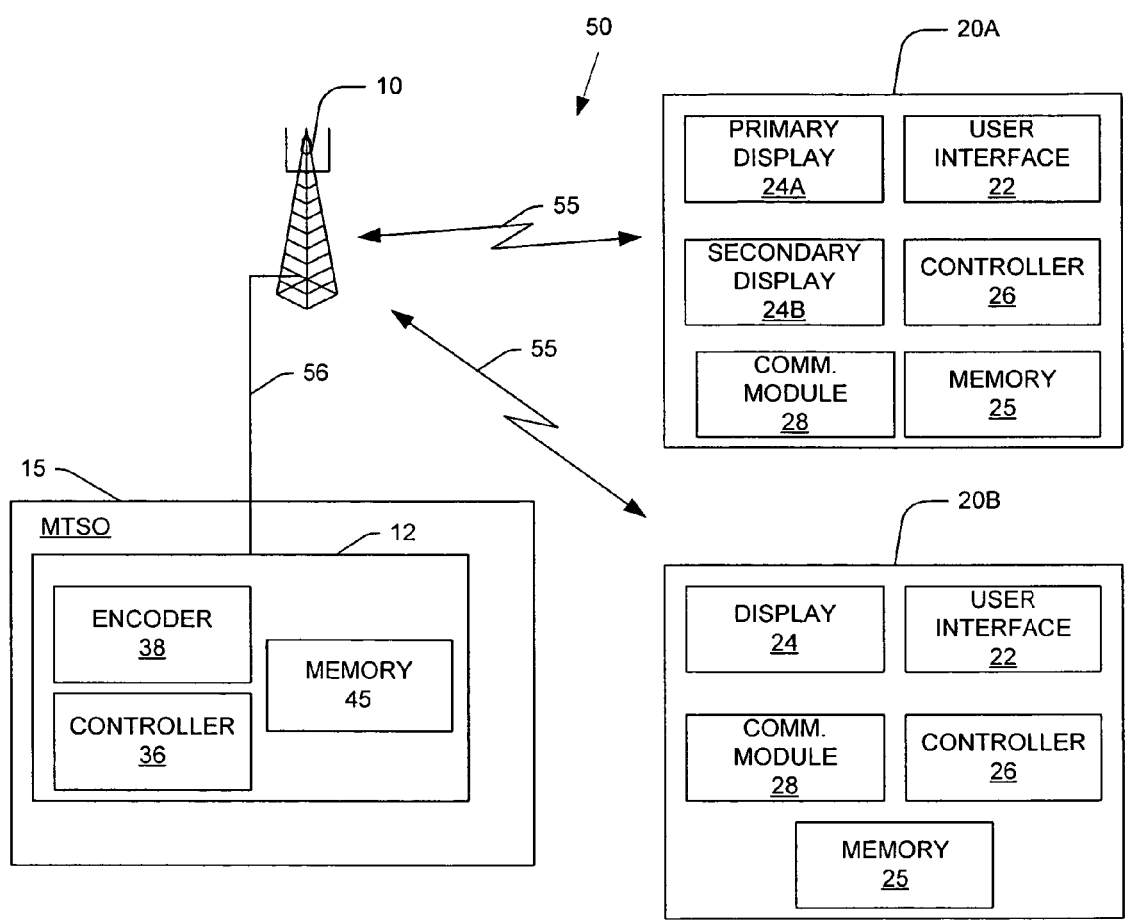
FIG. 1A is a block diagram of video distributing and/or playing methods and/or systems according to various embodiments of the present invention.

The present invention now will be described more fully hereinafter with reference to the accompanying figures, in which embodiments of the invention are shown. This invention may, however, be embodied in many alternate forms and should not be construed as limited to the embodiments set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like numbers refer to like elements throughout the description of the figures.

The present invention is described below with reference to block diagrams and/or flowchart illustrations of methods, apparatus (systems) and/or computer program products according to embodiments of the invention. It is understood that a block of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

As will be appreciated by one of skill in the art, the present invention may be embodied as a method, data processing system and/or computer program product. Thus, the present invention may take the form of an entirely hardware embodiment, an entirely software embodiment or an embodiment combining software and hardware aspects, which may be collectively referred to herein as a "circuit" or "module".

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

As used herein, a "communication terminal" includes, but is not limited to, a terminal that is configured to receive/transmit communication signals via a wireline connection, such as via a public-switched telephone network (PSTN), digital subscriber line (DSL), digital cable, or another data connection/network, and/or via a wireless interface with, for example, a cellular network, a wireless local area network (WLAN), and/or another communication terminal. When the communication terminal is configured to communicate over a wireless interface, it is referred to herein as a "wireless communication terminal" and/or a "wireless terminal." Examples of wireless terminals include, but are not limited to, a cellular telephone, personal data assistant (PDA), pager, and/or a computer that is configured to communicate data over a wireless communication interface that can include a cellular telephone interface, a Bluetooth interface, a wireless local area network interface (e.g., 802.11), another RF communication interface, and/or an optical/infra-red communication interface.

Figure 1B:
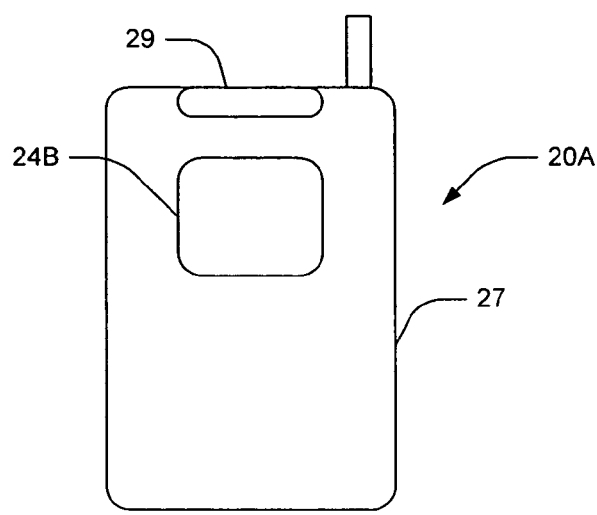
FIGS. 1B-1C illustrate mobile telephones which may receive and/or play video content according to embodiments of the present invention.
Figure 1C:
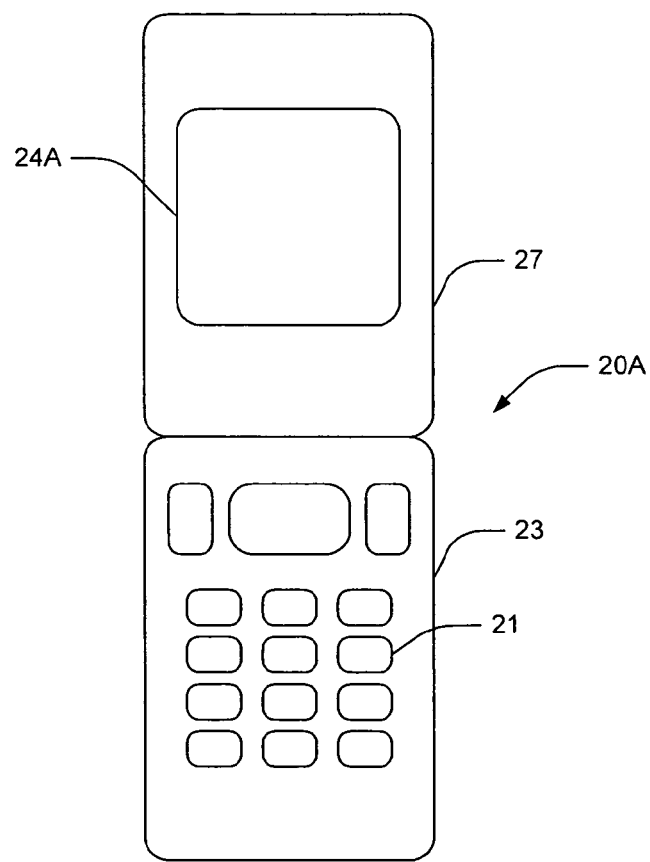

FIG. 1A is a schematic block diagram of a wireless communication system 50 that includes two wireless terminals 20A, 20B that are configured to communicate data through one or more cellular base stations 10. The wireless terminals 20A, 20B may additionally communicate with each other through a direct wireless connection such as a Bluetooth wireless connection, and/or over another wireless communication interface through a wireless local area network (WLAN). The wireless terminals 20A, 20B include a user interface 22, a controller 26, a communication module 28, and a memory 25. As illustrated in FIG. 1A, some wireless terminals 20A may include both a primary display 24A and a secondary display 24B. The primary display 24A and the secondary display 24B may have different display characteristics. For example, the primary display 24A and the secondary display 24B may have different screen sizes and/or may be capable of displaying video having different resolution, color depth, frame rate, etc. Some wireless terminals 20B may include only a single display 24. One possible arrangement of a primary display 24A and a secondary display 24B in a wireless terminal 20A is illustrated in FIGS. 1B and 1C. The wireless terminal 20A illustrated in FIGS. 1B and 1C is a flip-type mobile telephone having a body 23 on which a keypad 21 is located and a flip 27 attached to the body 23 by means of a hinge 29. A primary display screen 24A is located on the inside of the flip 29 (i.e. the side of the flip that is folded against the keypad 21 when the flip is closed). A secondary display screen 24B is located on the outside of the flip 29, such that the secondary display may be visible when the flip 27 is closed. As illustrated in FIGS. 1B and 1C, the primary display 24A may be larger than the secondary display 24B. In some embodiments, the primary display 24A may be a color display, while the secondary display 24B may be a black and white display or a color display having a lower resolution and/or color depth than the primary display 24A. It will be understood that, as used herein, the terms "primary" and "secondary" are arbitrary. Thus, in a particular wireless terminal, the "primary" display could be located on the outside of the terminal, while the "secondary" display could be located on the inside of the terminal. Moreover, a wireless terminal 20A need not have a flip or a hinge in order to have multiple display screens 24A, 24B.

Referring again to FIG. 1A, the user interface 22 can include a keypad, keyboard, touchpad, jog dial and/or other user input device. The user interface 22 can also include a microphone coupled to an audio processor that is configured to generate an audio data stream responsive to sound incident on the microphone, and a speaker that generates sound responsive to an input audio signal. The communication module 28 is configured to communicate data over a wireless interface 55 to a remote unit such as cellular base station 10, which communicates with a mobile telephone switching office (MTSO) 15 via a wired or wireless link 56. The memory 25 is configured to store a digital information signal such as a digital audio and/or video signal generated or received by the communication terminal 20, 20B.

The communication module 28 can include a cellular communication module, a Bluetooth module, and/or a WLAN module. With a cellular communication module, the wireless terminals 20A, 20B can communicate via the base station 10 using one or more cellular communication protocols such as, for example, Advanced Mobile Phone Service (AMPS), ANSI-136, Global Standard for Mobile (GSM) communication, General Packet Radio Service (GPRS), enhanced data rates for GSM evolution (EDGE), code division multiple access (CDMA), wideband-CDMA, CDMA2000, and Universal Mobile Telecommunications System (UMTS). The cellular base station 10 is connected to a Mobile Telephone Switching Office (MTSO) 15, which, in turn, may be connected to a telephone network, a computer data communication network (e.g. the internet), and/or another network. With a Bluetooth module, a wireless terminal 20A, 20B can communicate with other wireless communication terminals via an ad-hoc network. With a WLAN module, the wireless terminal 20A, 20B can communicate through a WLAN router (not shown) using a communication protocol that may include, but is not limited to, 802.11a, 802.11b, 802.11e, 802.11g, 802.11i.

A multimedia server 12 communicates with the base station 10. While the multimedia server 12 is illustrated in FIG. 1A as residing within the MTSO 15, it will be understood that the multimedia server 12 may reside outside the MTSO 15. The multimedia server may communicate with the MTSO 15 and/or the base station 10 through a wired or wireless connection, through the public switched telephone network, through the internet or another data communication network, and/or through another network. It will be understood, however, that in some embodiments the multimedia server 12 may not communicate with an MTSO 15 at all. For example, General Packet Radio Service (GPRS) data is not communicated through an MTSO. Moreover, embodiments of the invention may be advantageously employed in many different types of networks, including, for example, DVB-H and other networks. Alternatively, the multimedia server 12 may reside within one or more base stations 10. As shown in FIG. 1A, the multimedia server 12 includes a controller 36, an encoder 38 and a memory 45. The multimedia server 12 may additionally include a transmitter (not shown) configured to communicate via a wired or wireless connection with the MTSO 15 and/or with one or more base stations 10. The controller 36 is configured to convert a digital video data signal stored in the memory 45 of the multimedia server 12 into a digital information stream that is encoded by the encoder 38 as described more fully below. It will be understood by those having skill in the art that the controller 36 may be embodied by general purpose hardware, special purpose hardware and/or software, and can include one or more Digital Signal Processors (DSP) and/or coder/decoders (CODEC). Thus, the encoder 38, the controller 36 and/or the memory 45 may be embodied in a single chip or processing unit and/or multiple associated units.

The digital information stream generated by the multimedia server 12 may be multicast by one or more base stations 10 to a plurality of wireless communication terminals 20A, 20B. In some embodiments, the multimedia server 12 may include a transmitter and an antenna (not shown). Accordingly, the multimedia server 12 may multicast a digital information stream directly to a plurality of wireless communication terminals 20A, 20B. As used herein, the term "multicast" means point-to-multipoint transmission, i.e. transmitting the same digital and/or analog information signal to a plurality of receiving terminals.

Figure 2:
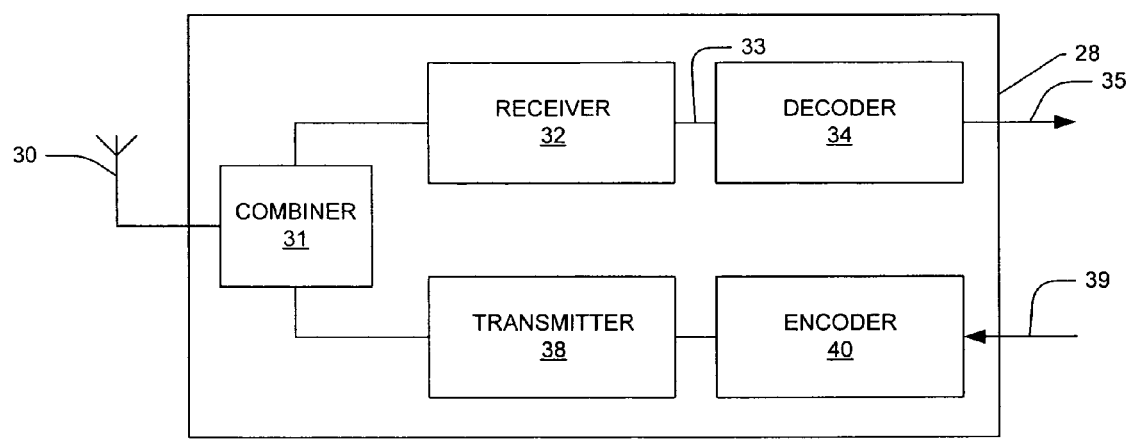
FIG. 2-5 are block diagrams of video distributing and/or playing methods and/or systems according to embodiments of the present invention.

As shown in FIG. 2, a communication module 28 of a wireless communication terminal 20A, 20B includes an antenna 30 for transmitting/receiving wireless communication signals. Antenna 30 is operably connected to a combiner 31, which permits the antenna 30 to be used for both sending and receiving wireless communication signals. Wireless communication signals, such as RF signals, may be received by a receiver 32 that is coupled to the antenna 30 through the combiner 31. The communication module 28 may also include a transmitter 38 for transmitting encoded digital signals 39 over antenna 30 through combiner 31.

Receiver 32 may include a number of elements, such as amplifiers, mixers, RF, IF and baseband processors, and other elements. Receiver 32 processes a wireless RF signal received via antenna 30 and generates a received digital signal 33. The received digital signal 33 may be encrypted and/or may be encoded with an error correction/detection code. In addition, the received digital signal 33 may be interleaved for data robustness. The decoder 34 processes the received digital signal 33, for example, to detect and correct errors in the received signal and/or to decrypt and/or de-interleave the received signal 33 to provide a decoded video signal 35. The decoded video signal 35 may be sent to the controller 26 of the communication terminal 20A, 20B and/or stored in the memory 25 of the communication terminal 20A, 20B. The communication terminal 20A, 20B may play the decoded video signal 35. As used herein, the term "playing" includes playing of audio and/or displaying of video. Thus, the decoded video signal 35 may be played using the display 24 and/or the speaker (not shown) of a wireless communication terminal 20A, 20B.

As discussed above, wireless communication terminals, such as communication terminals 20A, 20B, used in a particular network or communication system may have a wide range of functions and features. Thus, for example, some wireless communication terminals 20A, 20B in a network may be capable of receiving and playing high-quality video content, while other wireless communication terminals in the same network may only be capable of receiving and/or playing medium-quality or low-quality video content.

In some cases, wireless communication terminals 20A, 20B that may be capable of playing video content of a particular quality may nevertheless be capable of or suited for content having a particular format. For example, a wireless terminal 20A may be configured to display a DVD-quality video stream having a particular aspect ratio, such as 16:9, while another wireless terminal 20B on the same network may be configured to display DVD-quality video in a 4:3 aspect ratio. In another example, a first wireless terminal 20A may be capable of displaying video in a first screen resolution, such as, for example 320×200 pixels per frame, while another wireless terminal 20B may be capable of displaying video in a screen resolution of only 180×144 pixels per frame. Likewise, a first wireless terminal 20A may be capable of displaying images having a color depth of 256 colors, or 8 bits per pixel, while another wireless terminal 20B may be capable of displaying images having a color depth of 1024 colors, or 10 bits per pixel. Other examples of disparities between display capabilities of wireless communication terminals 20A, 20B are possible. For example, wireless terminals may vary in their ability to display video images at a particular frame rate. A particular combination of aspect ratio, image size and/or frame rate may be referred to as a video display format.

As noted above, some wireless terminals 20A may have multiple display screens such as a primary display 24A and a secondary display 24B which may have different display capabilities. For example, the primary display 24A may be configured to display a video stream having a 16:9 aspect ratio, while the secondary display 24B may be configured to display video in a 4:3 aspect ratio. Likewise, the primary display 24A may be capable of displaying video in 300×200 pixels per frame, while the secondary display 24B may only be capable of displaying 180×144 pixels per frame, and/or the primary display 24A may be capable of displaying images having a color depth of 8 bits per pixel, while the secondary display 24B may be capable of displaying images having a color depth of 10 bits per pixel.

Figure 3:
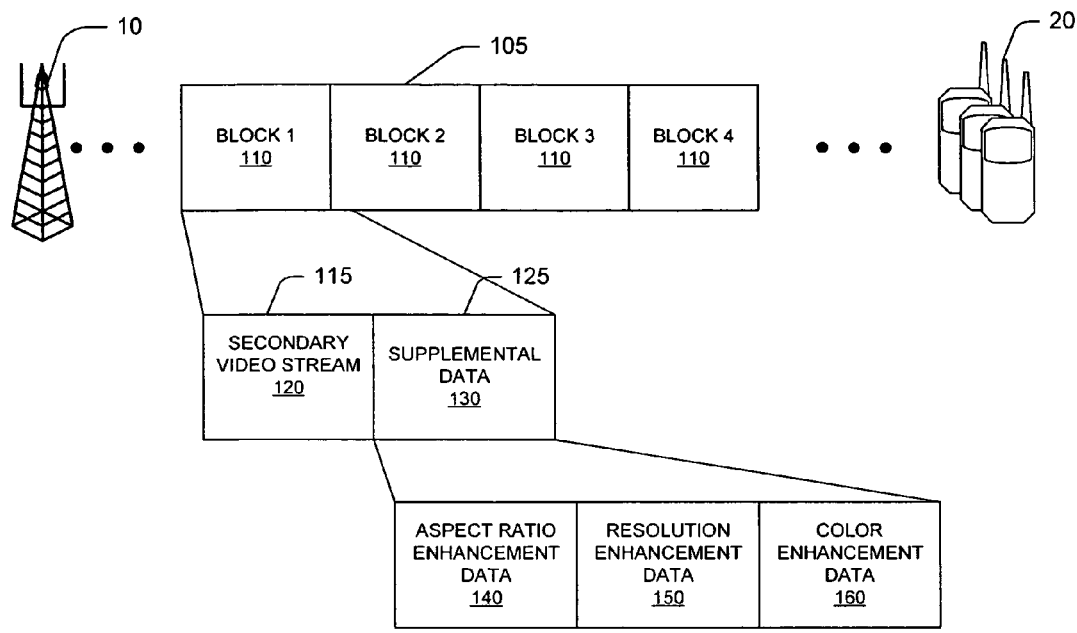

Referring now to the embodiments of FIG. 3, in order to accommodate wireless terminals 20A, 20B having a variety of capabilities, a primary video data stream formatted for display in a first video display format may be processed by the multimedia server 12 to form a transmission data stream 105 having a plurality of blocks 110 of video data. As illustrated in FIG. 3, a block 110 of the transmission data stream 105 includes at least a first data field 115 and a second data field 125. The first data field 115 contains a secondary video data stream 120 extracted from the primary video data stream and formatted for display in a second video format different from the first video format. The second data field 125 includes supplemental data 130 extracted from the primary video data stream and configured to provide, when combined with the data of the first data field 115, a tertiary video data stream formatted for display in a third video format.

The second field 125 may further be divided into sub-fields containing different kinds of data which may be used to enhance the second video data stream 120. Some examples of supplemental data 130 that may be contained in the second data field 120 are illustrated in FIG. 3. For example, the supplemental data 130 may include aspect ratio enhancement data 140, which, when combined with the secondary video data stream 120 in the first data field 130 may generate a tertiary video data stream having a different aspect ratio than the secondary video data stream 120. For example, the primary video data stream may have an aspect ratio of 1.778, corresponding to a 16:9 video format. The secondary video data stream 120, which is extracted from the primary video data stream, may be formatted to have an aspect ratio of 1.25, which may correspond to the QCIF video format of 180×144 pixels per frame, for example by removing peripheral image data from the edges of each video frame or by removing selected pixels from each frame. The tertiary video data stream may have a third aspect ratio different from the second aspect ratio. In some embodiments, the third aspect ratio may also be different from the first aspect ratio. That is, when the aspect ratio enhancement data 140 in the second data field 125 is combined with the secondary video data stream 120 in the first data field 115, a new video data stream may be generated having yet a third aspect ratio. For example, the tertiary video data stream may have a third aspect ratio of 1.333 corresponding to a 4:3 video format. In some embodiments, the tertiary video data stream may have a third aspect ratio equal to the first aspect ratio, i.e. 1.778.

In some embodiments, the supplemental data may include resolution enhancement data 150, which, when combined with the secondary video data stream 120 in the first data field 130 may generate a tertiary video data stream having a different resolution than the secondary video data stream 120. For example, the primary video data stream may have a resolution of 640×480 pixels per frame. The secondary video data stream 120, which is extracted from the primary video data stream, may be formatted to have a resolution of 180×144 pixels per frame, for example by removing selected pixel data from each video frame. The tertiary video data stream may have a third resolution different from the second resolution. In some embodiments, the third resolution may also be different from the first resolution. That is, when the resolution enhancement data 150 in the second data field 125 is combined with the secondary video data stream 120 in the first data field 115, a new video data stream may be generated having yet a third resolution. For example, the tertiary video data stream may have a third resolution of 320×200. In some embodiments, the tertiary video data stream may have a third resolution equal to the first resolution, i.e. 640×480 pixels per frame.

In yet further embodiments, the supplemental data may include color depth enhancement data 160, which, when combined with the secondary video data stream 120 in the first data field 115 may generate a tertiary video data stream having a different color depth than the secondary video data stream 120. For example, the primary video data stream may have a color depth of 10 bits per pixel. The secondary video data stream 120, which is extracted from the primary video data stream, may be formatted to have a color depth of 6 bits per pixel, for example by removing the four least significant bits of each pixel in a video frame. The tertiary video data stream may have a third color depth different from the second color depth. In some embodiments, the third color depth may also be different from the first color depth. That is, when the color depth enhancement data 160 in the second data field 125 is combined with the secondary video data stream 120 in the first data field 115, a new video data stream may be generated having yet a third color depth. For example, the tertiary video data stream may have a third color depth of 8 bits per pixel. In some embodiments, the tertiary video data stream may have a third color depth equal to the first color depth, i.e. 10 bits per pixel.

As illustrated in FIG. 3, the supplemental data in the second data field 125 may contain multiple types of enhancement data. For example, the second data field 125 may include aspect ratio enhancement data 140, resolution enhancement data 150, color enhancement data 160 and/or other types of supplemental data.

As shown in FIG. 3, the transmission data stream 105 comprising blocks 110 may be multicasted to a plurality of wireless communication terminals 20. Each of the wireless communication terminals 20 may receive and process all of each block or only some of the data in each block. In particular, each wireless communication terminal 20 may receive and process the first data field 115 containing the secondary video data stream 120. Each wireless communication terminal 20 may independently choose to receive the second data field 125 containing the enhancement data based on, for example, its defined audio and/or display characteristics.

Moreover, each wireless communication terminal 20 may choose to receive only so much of the second data field 125 as it desires in order to generate a video data signal having a desired format. For example, some wireless communication terminals may be unable to play video data signals having an aspect ratio different from the aspect ratio of the secondary video data stream, or an image size different from the image size of the secondary video data stream, or a color depth greater than the color depth of the secondary video data stream. Such a wireless communication terminal 20 may therefore have no need to receive the second data field 125. In such case, the wireless communication terminal 20 may, after receiving the first data field 115 of a block 110 of data, switch its receiver 32 off until the start of the next data block 110, thereby conserving battery power. It will be appreciated that switching the receiver 32 off may include removing power from the entire receiver circuit or only removing power from a portion of the receiver circuit, such as, for example, an amplifier chain, which may consume a comparatively large amount of power even when no signal is being received.

Alternatively, a wireless communication terminal 20 may be capable of displaying images at a color depth greater than the color depth of the secondary video stream 120 but unable to display video data streams at the third resolution or aspect ratio. Such a wireless communication terminal may switch its receiver 32 off after receiving the secondary video data stream 120 and switch the receiver 32 back on to receive only the color enhancement data 160.

Continuing the example, a particular wireless communication terminal 20 capable of displaying video images at the second aspect ratio, the third resolution and the second color depth may switch its receiver 32 off after receiving the secondary video data stream 120, switch its receiver 32 back on to receive the resolution enhancement data 150, and switch its receiver 32 off again after receiving the resolution enhancement data 150. Accordingly, the receiver 32 of each wireless terminal may remain on for only so long as required to receive data necessary to display the video data in the desired format, which may in some cases be the best possible format the wireless communication terminal 20 is able to display. In particular embodiments, the first data field 125 containing the secondary video stream 120 is contiguous with a field or sub-field containing a predetermined type of enhancement data, such as aspect ratio enhancement data, to permit a wireless communication terminal to receive the secondary video stream 120 and the enhancement data without turning the receiver off in between the fields, and then to turn the receiver off after receiving the secondary video stream 120 and the enhancement data.

In cases where it desirable for the wireless communication terminals 20 to be able to switch on and off within a block to receive desired data fields or sub-fields, it may be desirable to include additional timing and/or signal training codes at the start of each data field and/or sub-field to assist the wireless communication terminals 20 in synchronizing to the start of each data field and/or sub-field.

The wireless communication terminal 20 may receive the first data field 115 and store the first data field in the memory 25. The wireless communication terminal 20 may receive the second data field 125, or a sub-field thereof, and store the received data of the second data field 125 in the memory. The wireless communication terminal 20 may then combine the data of the first data field 115 with the enhancement data from the second data field 125 to generate a tertiary video data stream. In some embodiments, the wireless communication terminal 20 may not store the enhancement data in the memory 25. Instead, the communication module 28 may provide the received enhancement data directly to the controller 26, which combines the received enhancement data with the stored secondary video data stream 120 to generate a tertiary video data stream.

Figure 4:
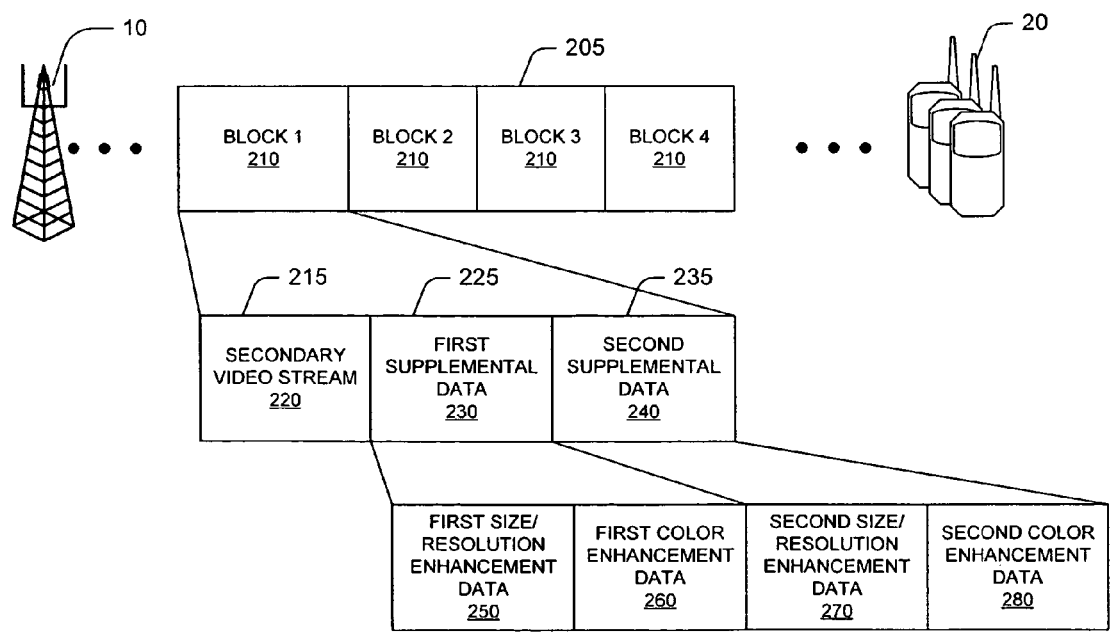

Additional configurations of the transmission data stream are illustrated in the embodiments of FIG. 4. As shown therein, a transmission data stream 205 may include a plurality of blocks 210. Each block 210 may include a first data field 215, a second data field 225 and a third data field 235. The first data field 215 may contain a secondary video data stream 120 extracted from a primary video data stream stored at the multimedia server 12. The second data field 225 may contain first supplemental data 230, while the third data field 235 may contain second supplemental data 240. The first supplemental data 230 may include both first size/resolution enhancement data 250 and first color enhancement data 260. The second supplemental data field 240 may include both second size/ resolution enhancement data 270 and second color enhancement data 280. The first supplemental data 230 may be configured to provide, when combined with the secondary video stream 220, a tertiary video stream having a different display format from the display format of the secondary video stream 220. The second supplemental data may be configured to provide, when combined with the secondary video stream 220, a fourth video stream having a different display format from the display format of the secondary video stream or the third video stream.

Figure 5A:
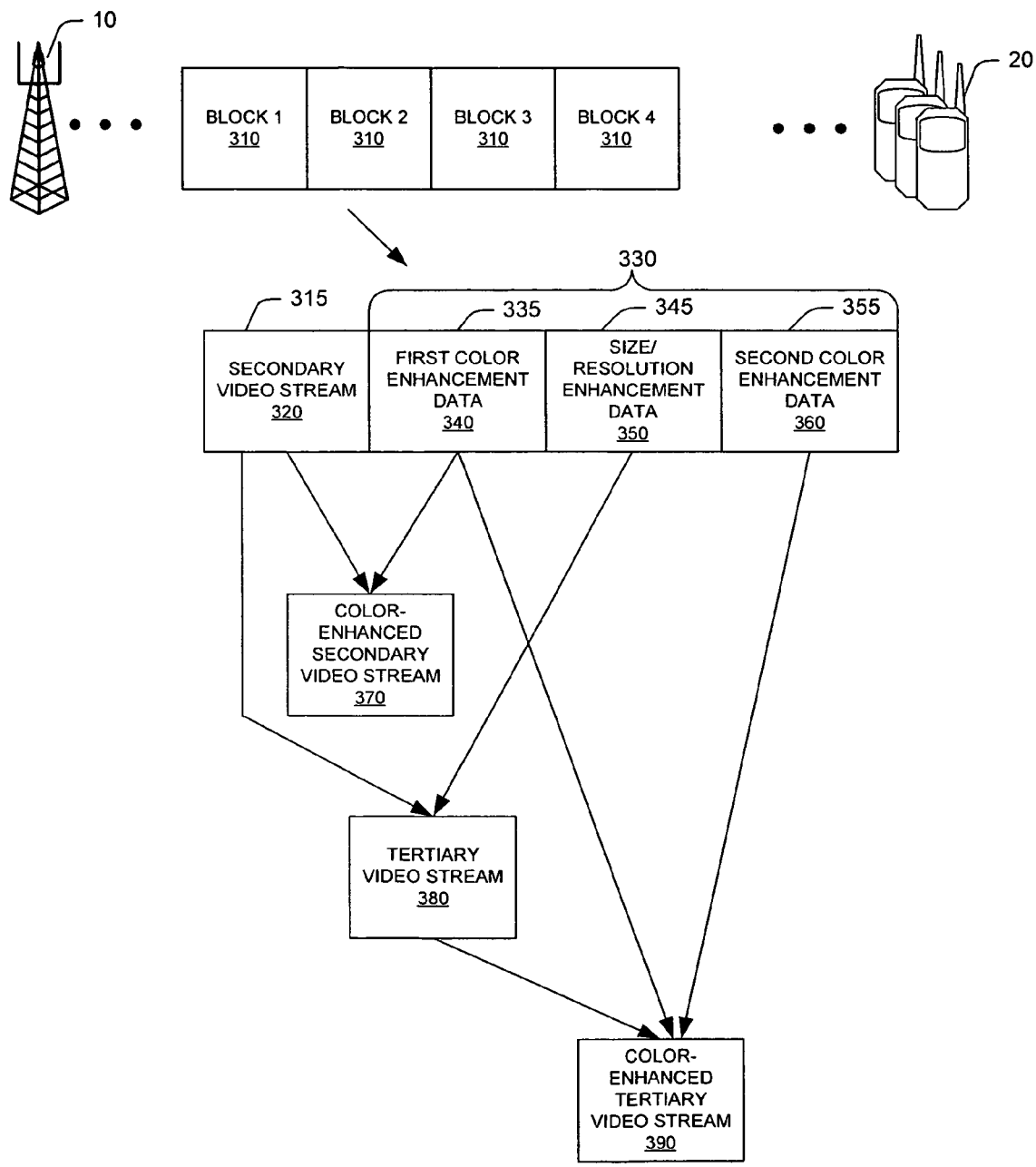

Referring now to the embodiments of FIG. 5A, a block 310 may include a first data field 315 containing a secondary video data stream 320 extracted from a primary video data stream and a second data field containing supplemental data 330. The supplemental data 330 may be organized into sub-fields 335, 345 and 355 containing, sequentially, first color enhancement data 340, size/resolution enhancement data 350 and second color enhancement data 360. Thus, a wireless communication terminal 20 may receive, as contiguous fields, the first data field 315 containing the secondary video data stream 320, the first color enhancement data 340 which may be combined with the secondary video data stream 320 to provide a color-enhanced secondary video data stream 370, the size/resolution enhancement data 350 which may be combined with the secondary video data stream 320 to provide a tertiary video data stream 380. The first color enhancement data 340 may contain sufficient data for enhancing the color of the secondary video data stream 320, but not the enhanced tertiary video data stream 380. Thus, the second color enhancement data 360 may be provided to enhance the color of the tertiary video data stream 380 along with the first color enhancement data 340 to provide a color-enhanced tertiary video data stream 390.

Figure 5B:
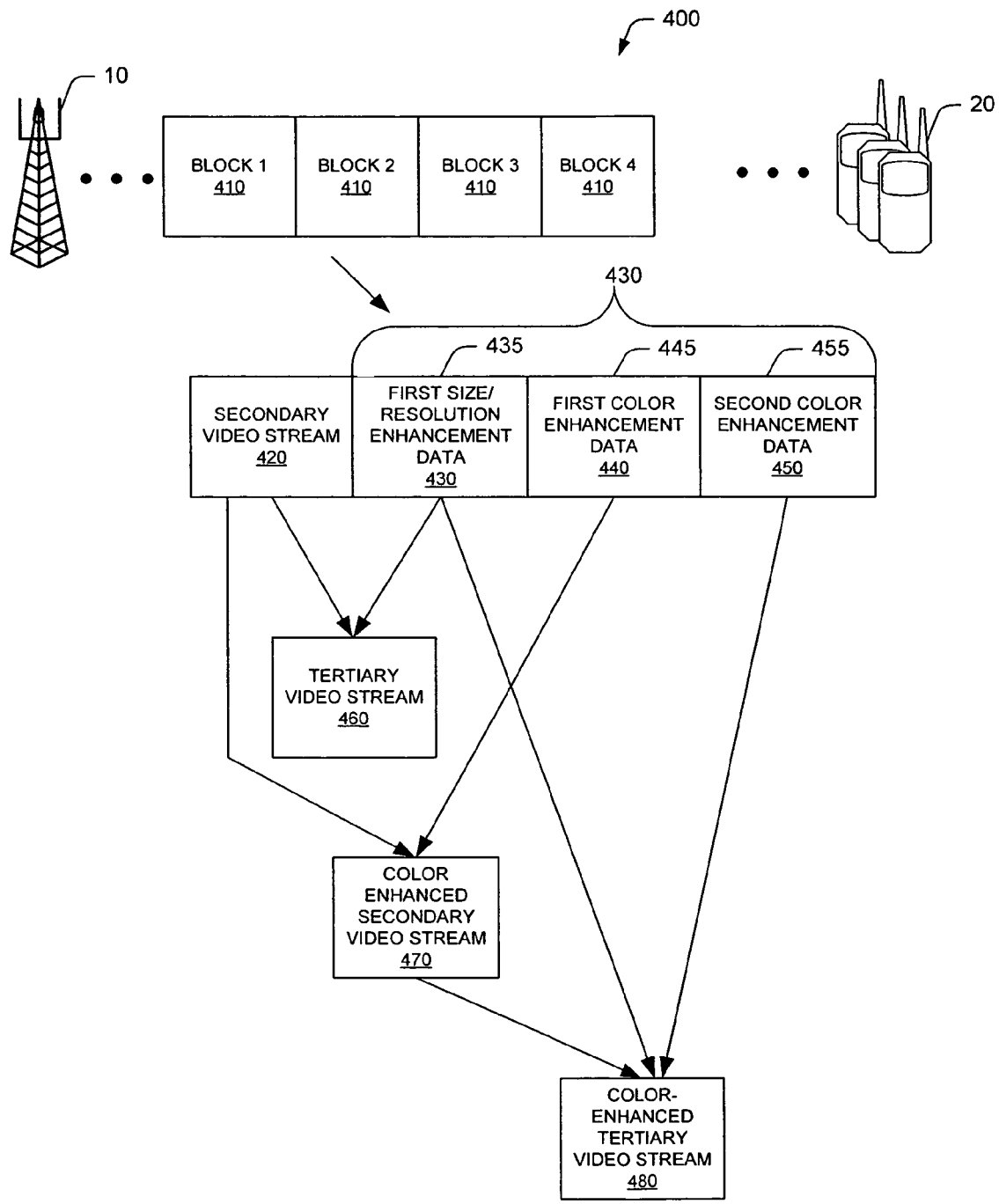

It will be appreciated that the order in which various types of enhancement data are positioned within the supplemental data may be modified as desired to provide a desired functionality in the system. For example, as illustrated in the embodiments of FIG. 5B, the first sub-field 435 may contain first size/resolution enhancement data 430, the second sub-field 445 may contain first color enhancement data 440, and the third sub-field 455 may contain second color enhancement data 450, some or all of which may be combined with the secondary video data stream 420 to generate a tertiary video data stream 460, a color enhanced secondary video data stream 470 and/or a color-enhanced tertiary video data stream 480 as illustrated.

Figure 6:
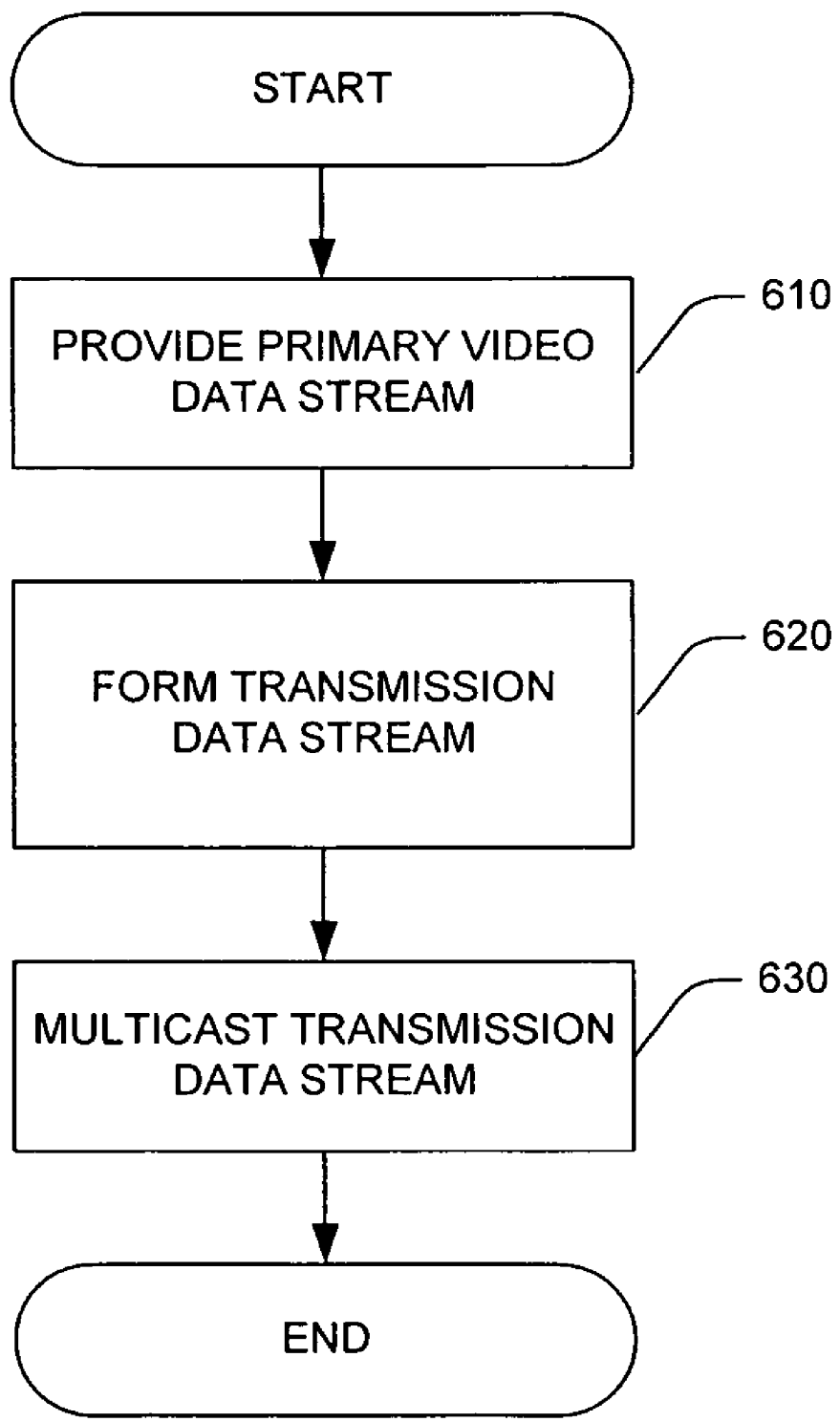
FIGS. 6-10 are flowcharts of operations that may be performed to distribute and/or play video content according to various embodiments of the present invention.

FIG. 6 is a flowchart of operations that may be performed by a multimedia server in a multimedia distribution system according to some embodiments of the invention. A primary video data stream is provided (block 610). A transmission data stream is formed (block 620), for example, by extracting a secondary video data stream from the primary video data stream, generating supplemental data that, when combined with the secondary video data stream may form a tertiary video data stream, and organizing the secondary video data stream and the supplemental data into blocks. The transmission data stream is then multicast to a group of wireless communication terminals (block 630).

Figure 7:
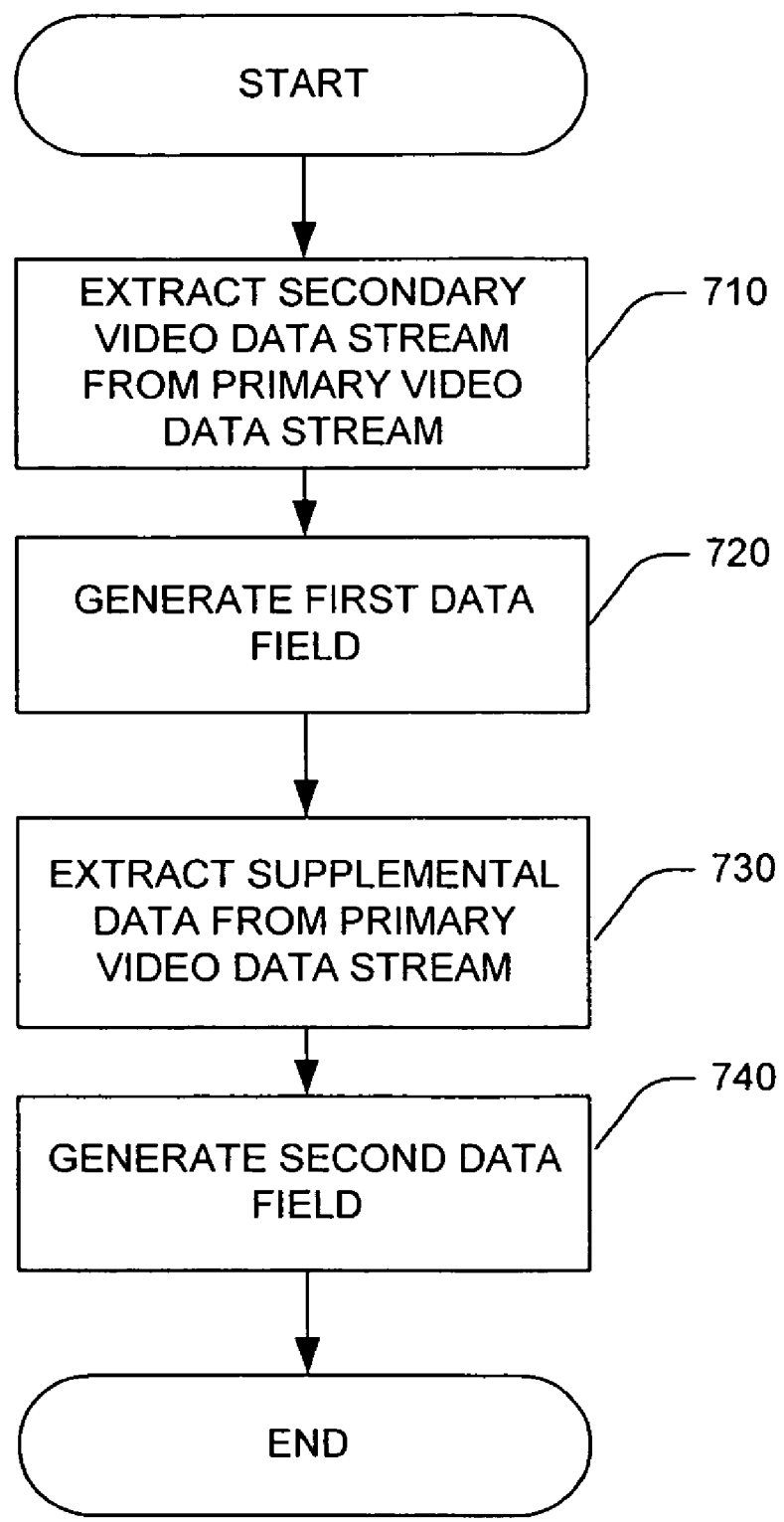

FIG. 7 is a flowchart illustrating the generation of a transmission data stream. A secondary video data stream is extracted from a primary video data stream (block 710). A first data field is generated using the secondary video data stream (block 720). Supplemental data is extracted from the primary video data stream (block 730), and a second data field is generated using the supplemental data (block 740).

Figure 8:
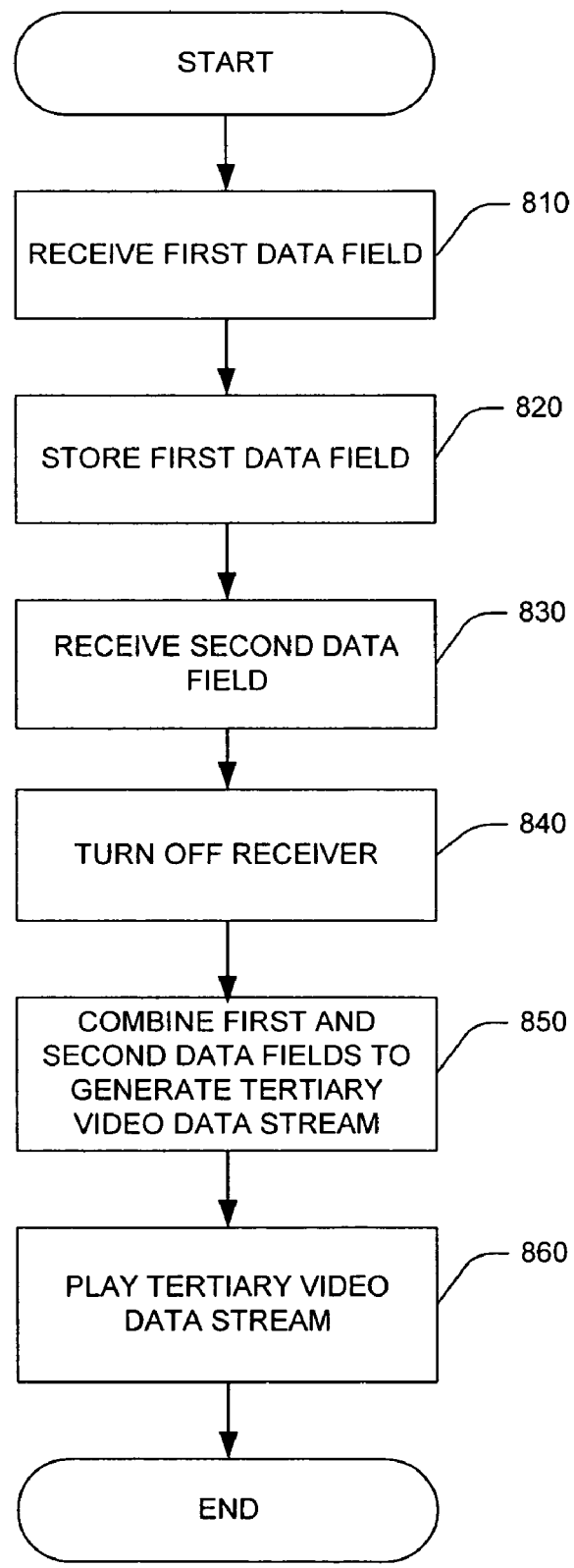

FIG. 8 is a flowchart of operations that may be performed by a wireless communication terminal according to some embodiments of the invention. A first data field is received (block 810) and stored in memory (block 820). A second data field is received (block 830). After receipt of the first and/or second data fields, the receiver of the wireless communication terminal may optionally be switched off (block 840). The first and second data fields are then combined to generate a tertiary video data stream (block 850), and the tertiary video data stream is played at the wireless communication terminal (block 860).

Figure 9:
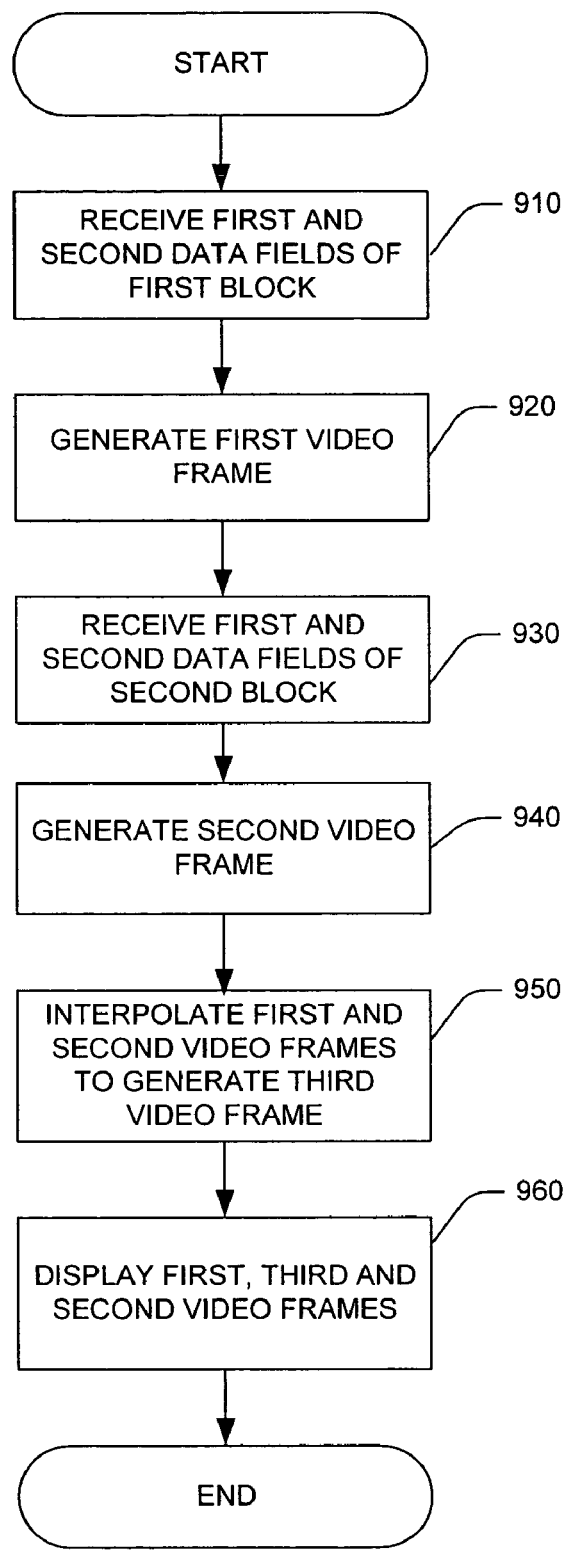

FIG. 9 illustrates further operations that may be performed by wireless communication terminals according to some embodiments of the invention. Due to bandwidth limitations in some systems, it may be desirable to transmit video data at a reduced frame rate (i.e. number of frames per second) despite the fact that a wireless communication terminal may be capable of displaying video data at a higher frame rate. In such cases, to improve the apparent quality of the signal and/or to reduce image flicker, it may be desirable for the wireless communication terminal to generate and display additional video frames. In some embodiments, each block of a transmission data stream may correspond to a video frame. Accordingly, in some embodiments, first and second data fields of a first block of a transmission data stream are received at a wireless communication terminal (block 910). A first frame of video is generated using the received data fields (block 920). First and second data fields of a second block are then received (block 930) and a second frame of video is generated using the data fields of the second block (block 940). The first and second video frames are interpolated to generate a third video frame (block 950). The first, third and second frames are then played in order at the wireless communication terminal (block 960).

Figure 10:
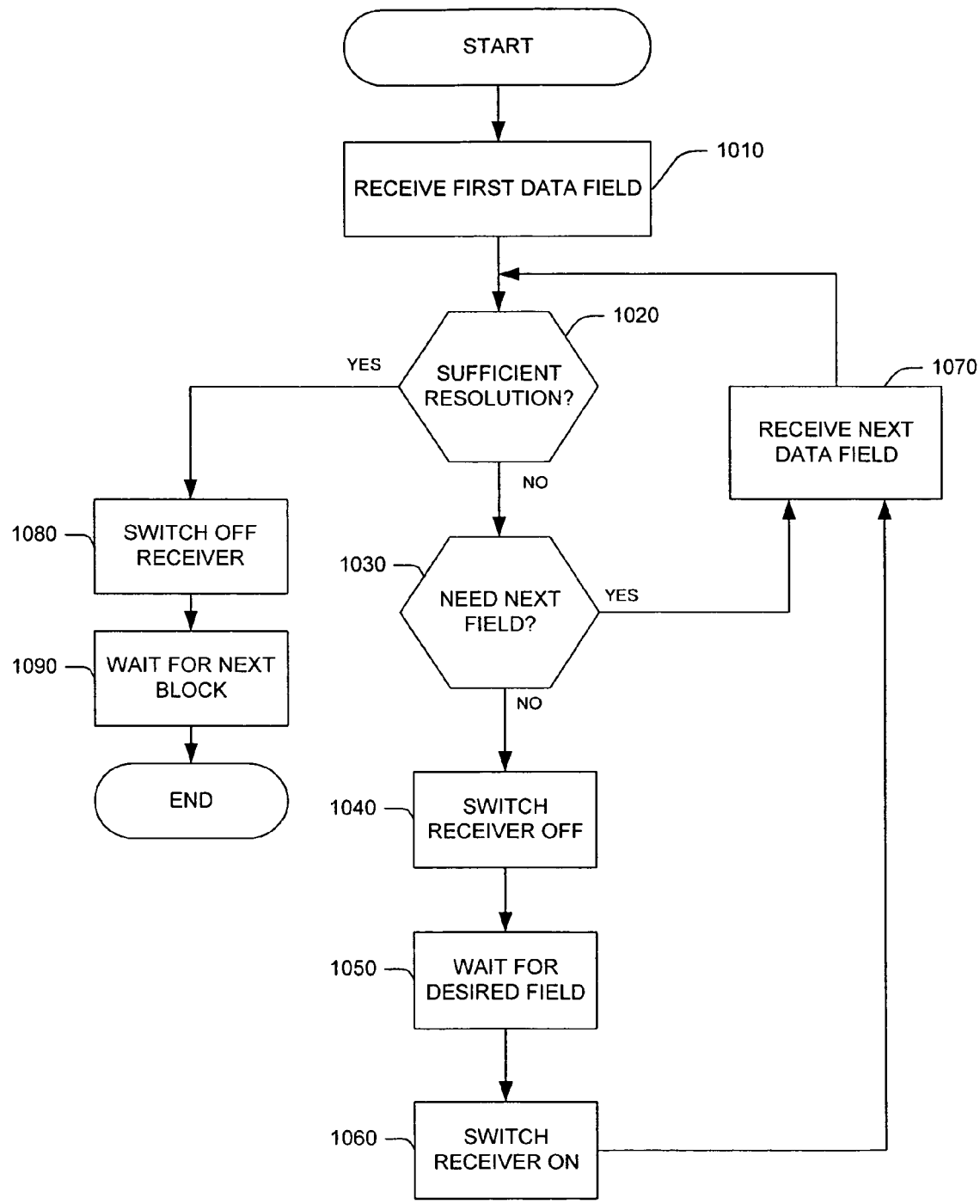

FIG. 10 illustrates further operations that may be performed at a wireless communication terminal. A first data field of a block of a transmission data stream is received at the wireless communication terminal (block 1010). The wireless communication terminal determines if the received first data field provides the desired format for playback (block 1020). If so, the receiver is switched off (block 1080) and the wireless communication terminal waits for the next block of data (block 1090). If additional resolution or enhancement is desired, the wireless communication terminal determines if the next field of data in the block is needed (block 1030). If it is, the wireless communication terminal receives the next data field (block 1070). If it is not needed, the receiver is switched off (block 1040) and the wireless communication terminal waits for the desired field (block 1050). When the desired field is transmitted, the wireless communication terminal switches the receiver on (block 1060) and receives the desired field (block 1070).

After receiving the data field (block 1070), the wireless communication terminal again determines if the received fields provide enough data for the desired format (block 1020), and the wireless communication terminal continues from that point until it has received enough data to generate a video data stream having a desired playback format.

It will be understood that, as used herein, the term "decoder" is not limited to the conversion of a coded media file to an output signal, but may include file management, the ability to combine the two sets of data described herein, the ability to manage streaming and/or playback of stored files, etc. Also, as used herein, the term "server" is not limited to a personal computer or similar device connected to a network at a fixed location. The playing devices described herein might also be equipped with a "server" function, which can permit a distributed or peer-to-peer topology for the distribution of the files described herein.

Embodiments of the invention have been described in connection with a cellular telephone network. However, it will be appreciated by those skilled in the art that embodiments of the invention may be advantageously employed in other digital transmission networks, including, for example, DAB networks, DVB networks, and others.

It will be further understood that video data streams may, and generally do, include an associated audio data stream. Thus, references herein to video data and video data streams include audio data and audio data streams and may encompass signals having audio-only components.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A video distribution method comprising:
providing a primary video data stream formatted in a first video display format;
generating a secondary video data stream extracted from the primary video data stream and formatted for display in a second video format;
generating supplemental data extracted from the primary video data stream and configured to provide, when combined with the secondary video data stream, a tertiary video data stream formatted for display in a third video format;
forming a transmission data stream comprising a plurality of blocks of data including the secondary video data stream and the supplemental data; and
multicasting the transmission data stream to a plurality of communication terminals.

2. The method of claim 1, further comprising:
receiving a first data field of a block of the multicasted video data stream at one of the plurality of communication terminals over a wireless air interface;
receiving a second data field of the block of the multicasted video data stream at the communication terminal;
combining the first data field and the second data field to generate the tertiary video data stream; and
displaying the tertiary video data stream at the communication terminal.

3. The method of claim 2, wherein a block of the video data stream corresponds to a video frame.

4. The method of claim 2, wherein the first and second data fields are contiguous within the transmission data stream.

5. The method of claim 2, wherein the first and second data fields are contiguous within the transmission data stream and wherein the communication terminal comprises a wireless receiver that receives the transmission data stream, the method further comprising switching the wireless receiver off after receiving the second data field of a first block of the transmission data stream and switching the receiver on at the start of a subsequent block of the transmission data stream.

6. The method of claim 2, wherein the communication terminal comprises a wireless receiver that receives the transmission data stream, the method further comprising switching the wireless receiver off after receiving the first data field of a first block of the transmission data stream, and switching the receiver on again at the start of a subsequent block.

7. The method of claim 2, further comprising storing the second data field in a memory in the communication terminal prior to combining the first data field and the second data field.

8. The method of claim 1, wherein the primary video data stream comprises video data having a first number of lines per frame and a first number of pixels per line, and the secondary video data stream comprises video data having a second number of lines per frame that is less than the first number of lines per frame and/or a second number of pixels per line that is less than the first number of pixels per line.

9. The method of claim 8, wherein the tertiary video data stream comprises video data having a third number of lines per frame that is greater than the second number of lines per frame and/or a third number of pixels per line that is greater than the second number of pixels per line.

10. The method of claim 1, wherein the primary video data stream comprises video data having a first number of bits per pixel, and the secondary video data stream comprises video data having a second number of bits per pixel that is less than the first number of bits per pixel.

11. The method of claim 10, wherein the tertiary video data stream comprises video data having a third number of bits per pixel that is greater than the second number of bits per pixel.

12. The method of claim 1, wherein the primary video data stream comprises video data having a first number of frames per second, and the secondary video data stream comprises video data having a second number frames per second that is less than the first number of frames per second.

13. The method of claim 12, wherein the tertiary video data stream comprises video data having a third number of frames per second that is greater than the second number of frames per second.

14. The method of claim 2, wherein a block of the transmission data stream corresponds to a video frame, and wherein receiving the first data field of a block of the multicasted video data comprises receiving the first data field of a first block of the multicasted video data, and wherein combining the first data field and the second data field of the first block comprises generating a first video frame, the method further comprising:
receiving a first data field of a second block of the multicasted video data stream at the communication terminal;
storing the first data field of the second block in the memory;
receiving a second data field of the second block of the multicasted video data stream at the communication terminal;
combining the first data field and the second data field to generate a second video frame; and
interpolating the first video frame and the second video frame to generate a third video frame between the first video frame and the second video frame.

15. The method of claim 14, further comprising:
sequentially displaying the first video frame, the third video frame and the second video frame at the receiving wireless terminal.

16. An audiovisual distribution method comprising:
providing a primary audiovisual data stream formatted in a first display format;
extracting from the primary audiovisual data stream a secondary audiovisual data stream formatted for display in a second display format;
preparing a block of a transmission data stream comprising at least a first data field containing the secondary audiovisual data stream, and a second data field containing supplemental data configured to provide, when combined with data of the first data field, an enhanced audiovisual data stream formatted for display in a third format different from the first and second display formats; and
multicasting the transmission data stream to a plurality of communication terminals.

17. The method of claim 16, further comprising:
receiving the first data field of a block of the multicasted audiovisual data stream at a communication terminal;
receiving the second data field of the block of the multicasted audiovisual data stream at the communication terminal;
combining the first data field and the second data field to provide an enhanced audiovisual data stream; and
playing the enhanced audiovisual data stream at the communication terminal.

18. The method of claim 17, wherein a block of the transmission data stream includes a third data field containing supplemental data configured to provide, when combined with data of the first data field, an enhanced audiovisual data stream formatted for display in a fourth display format different from the second and third display formats.

19. The method of claim 17, wherein the communication terminal comprises a wireless receiver, the method further comprising switching the wireless receiver off after receiving the second data field.

20. The method of claim 16, wherein the primary audiovisual data stream comprises video data having a first number of lines per frame, a first number of pixels per line, a first number of bits per pixel, and a first number of frames per second, and the secondary video data stream comprises video data having a second number of lines per frame that is less than the first number of lines per frame, a second number of pixels per line that is less than the first number of pixels per line, a second number of bits per pixel that is less than the first number of bits per pixel, and/or a second number frames per second that is less than the first number of frames per second.

21. The method of claim 20, wherein the enhanced audiovisual data stream comprises video data having a third number of lines per frame that is greater than the second number of lines per frame, a third number of pixels per line that is greater than the second number of pixels per line, a third number of bits per pixel that is greater than the second number of bits per pixel, and/or a third number of frames per second that is greater than the second number of frames per second.

22. The method of claim 17, wherein a block of the audiovisual data stream corresponds to a video frame, and wherein receiving the first data field of a block of the multicasted audiovisual data comprises receiving the first data field of a first block of the multicasted audiovisual data, and wherein combining the first data field and the second data field of the first block comprises generating a first video frame, the method further comprising:
receiving a first data field of a second block of the multicasted audiovisual data stream at the receiving wireless terminal;
storing the first data field of the second block in the memory;
receiving a second data field of the second block of the multicasted audiovisual data stream at the receiving wireless terminal;
combining the first data field and the second data field to generate a second video frame; and
interpolating the first video frame and the second video frame to generate a third video frame between the first video frame and the second video frame.

23. A wireless communication terminal comprising:
a wireless receiver; and
a controller coupled to the wireless receiver and configured to receive a first data field of a block of a multicasted video data stream from the wireless receiver and store the received first data field in the memory, receive a second data field of the block of the multicasted video data stream, combine the first data field and the second data field to generate an enhanced video data stream, and play the tertiary video data stream;

wherein the controller is further configured to switch the wireless receiver off after receiving the first and/or second data field.

24. The wireless communication terminal of claim 23, wherein the controller is further configured to generate a first video frame from the first data field and the second data field, receive first and second data fields of a second block of the multicasted video data stream, combine the first and second data fields of the second block of the video data stream to generate a second video frame, and interpolate the first video frame and the second video frame to generate a third video frame intermediate the first video frame and the second video frame.

25. The wireless communication terminal of claim 24, wherein the controller is further configured to sequentially play the first video frame, the third video frame and the second video frame.

26. A wireless communication system comprising:
a multimedia server configured to extract a secondary video data stream from a primary video data stream, and to form a transmission data stream comprising a plurality of blocks of data having at least first and second data fields, wherein the first data field includes the secondary video data stream and the second data field includes supplemental data configured to provide, when combined with the first data field, a tertiary video data stream.

27. The wireless communication system of claim 26, wherein the primary video data stream is formatted for display in a first video format, the secondary video data stream is formatted for display in a second video format different from the first video format.

28. The wireless communication system of claim 27, wherein the tertiary video data stream is formatted for display in a third video display format different from the first and second video display formats.

29. The wireless communication system of claim 28, wherein the first and third video display formats are the same.

30. The wireless communication system of claim 26, wherein the system further includes a plurality of wireless communication terminals, respective ones of said plurality of wireless communication terminals comprising a memory, a receiver; and a controller coupled to the memory and the receiver and configured to receive a first data field of a block of the transmission data stream from the receiver and store the received first data field in the memory, receive a second data field of the block of the transmission data stream, combine the first data field and the second data field to generate an enhanced video data stream, and play the tertiary video data stream.

31. A video distribution method comprising:
providing a primary video data stream having a first image size and formatted in a first video display format;
forming a transmission data stream comprising a plurality of blocks of data having at least first, second and third data fields, wherein the first data field includes a secondary video data stream extracted from the primary video data stream and formatted for display in a second video format, and the second data field includes color enhancement data extracted from the primary video data stream, and the third data field includes size/resolution enhancement data extracted from the primary video data stream, wherein the color enhancement data is configured to provide, when combined with the data of the first data field, a color-enhanced secondary video data stream and wherein the size/resolution enhancement data is configured to provide, when combined with the data of the first data field, a tertiary video data stream formatted for display in a third video format; and
multicasting the transmission data stream from a transmitter to a plurality of receiving wireless terminals.

32. The method of claim 31, wherein the transmission data stream further includes a fourth data field including second color enhancement data configured to provide, when combined with the data of the first, second and third data fields, a color-enhanced tertiary video data stream formatted for display in the third video format.

33. A wireless communication terminal comprising:
a wireless receiver;
a primary display configured to display a video data stream in a first video display format;
a secondary display configured to display a video data stream in a second video display format; and
a controller coupled to the wireless receiver and configured to receive a first data field of a block of a multicasted video data stream from the wireless receiver and store the received first data field in the memory, receive a second data field of the block of the multicasted video data stream, combine the first data field and the second data field to generate an enhanced tertiary video data stream, and play the enhanced tertiary video data stream on one of the primary display or the secondary display.

34. The wireless communication terminal of claim 33, wherein the controller is further configured to generate a first video frame from the first data field and the second data field, receive first and second data fields of a second block of the multicasted video data stream, combine the first and second data fields of the second block of the video data stream to generate a second video frame, and interpolate the first video frame and the second video frame to generate a third video frame intermediate the first video frame and the second video frame.

35. The wireless communication terminal of claim 34, wherein the controller is further configured to sequentially play the first video frame, the third video frame and the second video frame.

36. The wireless communication terminal of claim 33, wherein the controller is further configured to store the second data field in a memory in the wireless communication terminal prior to combining the first data field and the second data field.

37. The wireless communication terminal of claim 23, wherein the controller is further configured to store the second data field in a memory in the wireless communication terminal prior to combining the first data field and the second data field.

* * * * *